United States Patent [19]
Aguilar et al.

[11] Patent Number: 5,681,597
[45] Date of Patent: Oct. 28, 1997

[54] VACUUM CONVEYOR PICKER FOR BLOW BOTTLE CONTAINER

[75] Inventors: Albert Aguilar, Carol Stream; Larry A. White, St. Charles, both of Ill.

[73] Assignee: Liquid Container L.P., West Chicago, Ill.

[21] Appl. No.: 597,188

[22] Filed: Feb. 6, 1996

[51] Int. Cl.[6] .................................................. B29C 49/70
[52] U.S. Cl. .......................... 425/537; 198/471.1; 425/540
[58] Field of Search ................................ 425/537, 540; 198/471.1

[56] References Cited

U.S. PATENT DOCUMENTS

| | | | |
|---|---|---|---|
| 3,124,065 | 3/1964 | Bozek et al. | 198/471.1 |
| 3,949,860 | 4/1976 | Bilodeau | 425/537 |
| 4,213,750 | 7/1980 | Kubota et al. | 425/537 |
| 4,752,206 | 6/1988 | Nowicki et al. | 425/537 |
| 4,902,217 | 2/1990 | Martin et al. | 425/537 |
| 5,028,229 | 7/1991 | Keyser | 425/540 |
| 5,039,298 | 8/1991 | Takakusaki et al. | 425/540 |

FOREIGN PATENT DOCUMENTS

| | | | |
|---|---|---|---|
| 401698 | 12/1990 | European Pat. Off. | 198/471.1 |
| 59-26822 | 2/1984 | Japan | 198/471.1 |

*Primary Examiner*—Robert Davis
*Attorney, Agent, or Firm*—Hill, Steadman & Simpson

[57] ABSTRACT

A vacuum conveyor made up of a plenum and a moving plastic chain with attached buckets shaped to guide and accept and emerging molded article which travelling at zero relative velocity operates as a picker device for a blow molding machine of the type having a rotating mold wheel.

10 Claims, 4 Drawing Sheets

5,681,597

1

VACUUM CONVEYOR PICKER FOR BLOW BOTTLE CONTAINER

BACKGROUND OF THE INVENTION

1. Field of the Invention

This invention relates generally to blow molding machine technology and more particularly to a vacuum picker for a blow bottle container which is adapted to take-off a bottle from the wheel of a blow molding machine and to place that container on a conveyor or other transport mechanism for subsequent handling.

2. The Prior Art

The prior art is exemplified by prior issued patents owned by the assignee of the present invention, and particularly U.S. Pat. Nos. 4,834,641, 4,919,879, 4,973,241, and 5,028,229. In those patents there is disclosed the utilization of a continuous drive closed circuit which is provided by a guide track means and forms a secondary path in which a carriage or trolley carrying an air actuated means for picking and holding a label for transport to a matched segmental transfer station at which the mold parts and the carriage move in unison at zero relative velocity during which the label is automatically deposited in a mold for application to the plastic part being formed by the mold. Such machines are so-called "in-mold labeling machines", (IML machines). However, whether the particular blow molding machines are IML machines or machines for blowing containers without labels pre-affixed to the container, some form of picker device must be utilized to facilitate the removal of the molded article from the wheel and to place it on a transport means, such as a conveyor belt, or some other form of mechanical transport means.

Most of the prior art machines presently in use utilize a reciprocating picker device which must be closely coordinated with the movement of the wheel or a vacuum arrangement which must likewise be coordinated with the movement of the wheel. With such prior art devices a reciprocating arm moves in and out of a retrieving zone, or the vacuum device, if such be used, is alternately turned on and off. Thus the molded article is more or less forcibly removed from the wheel. Oftentimes, in such prior art arrangements, the picker action utilizes a free gravitational fall in the course of transporting the molded article to a point of further utilization.

SUMMARY OF THE INVENTION

The present invention contemplates the utilization of what can be characterized as the "zero relative velocity concept" in that the picker device of the present invention has a plurality of "pickers" which are rotated through a relatively circular or closed circuitous path adjacent the wheel and at a speed which is synchronized with the relative rotational speed of the wheel carrying a plurality of molds. By use of the term "zero relative velocity", I mean to specify that relative velocity that will enhance and promote the engineering concept of exchange or transfer without reduction in the speed of flow, viz, in the instance of this invention, the picker action in removing a molded article from a rotating wheel. When each mold opens up, the molded container carried within the mold is received into the tapered arms of a bucket forming a part of the picker device and the molded container is held in position by vacuum developed interiorly of the bucket walls.

While so situated, the molded article, or "blow-bottle", if such be the case, is carried away from the mold, thereby conditioning the mold to be recycled for receiving another parison for the production of another molded article.

Meanwhile, the buckets of the continuously rotating pickers carry the respective containers to a position remote from the wheel and each bucket delivers its respective container onto a conveyor device.

The basic system of the invention exploits the utilization of a vacuum conveyor made up of a plenum and a moving plastic chain with attached urethane plastic buckets shaped to guide and accept an emerging molded article while travelling at a "zero relative velocity", thereby completely eliminating the need for robot arm grippers, and further eliminating the need of free gravity drops into moving buckets, as in the use of starwheels, and without the need of driving the molded articles by air flow, such as in the use of vacuum tunnels.

DESCRIPTION OF THE PREFERRED EMBODIMENTS

The picker device of the present invention is of general utility for any kind of a blow molding machine having a circular multiple mold path. Thus, the picker of the present invention can be used effectively with ordinary blow molding machines as well as with blow molding machines of the IML type, i.e., blow molding machines of the in-mold labeling type.

Figure 1:
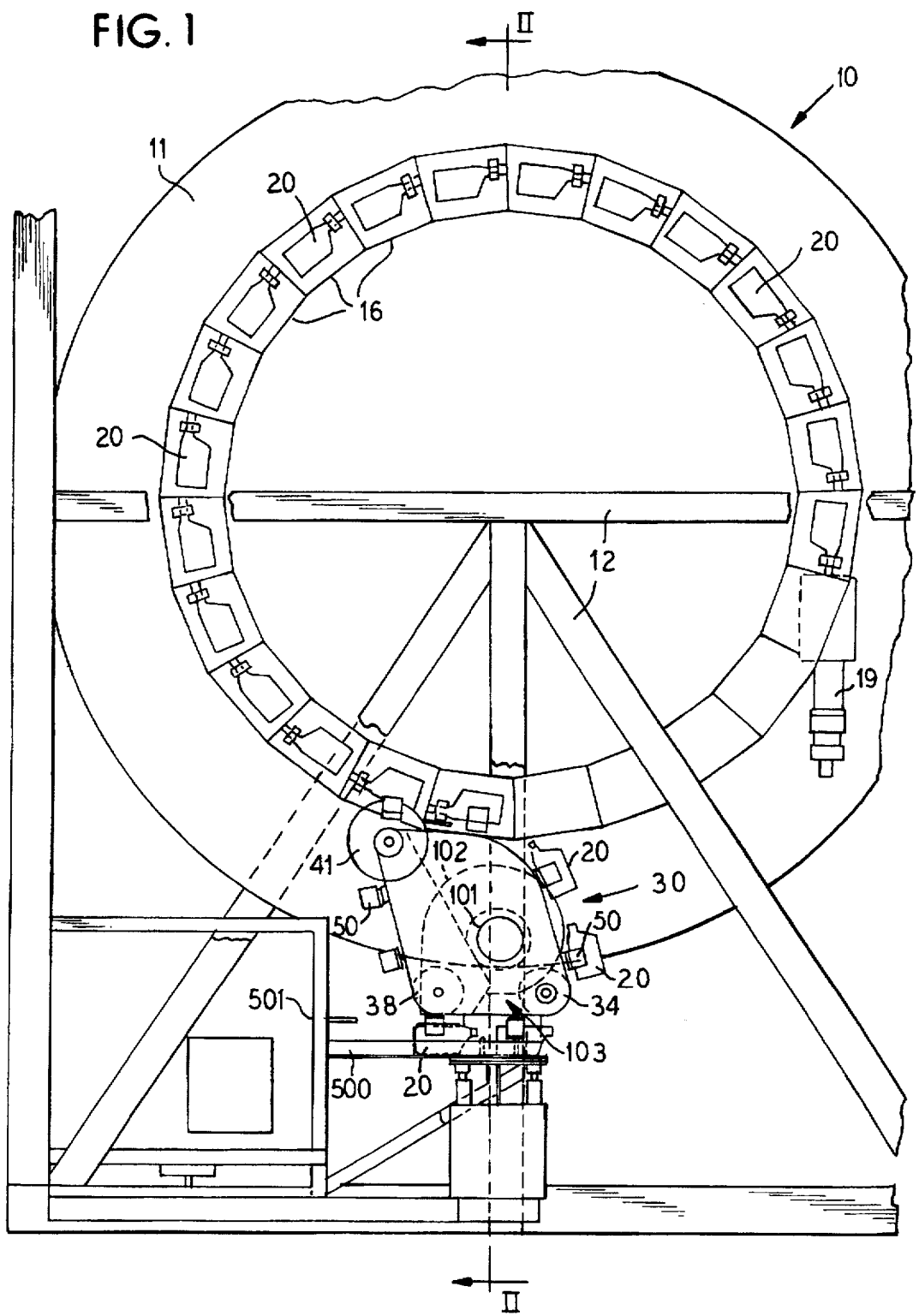
FIG. 1 is an elevational view of a blow molding machine wheel carrying multiple molds and with some parts removed for the sake of simplification and embodying a picker mechanism in accordance with the principles of the present invention.

Referring to the exemplary form of disclosure illustrated in the drawings by way of example, there is shown in FIG. 1 a blow molding machine 10 having a primary circular multiple mold path established by a wheel 11 rotatably mounted in a frame 12 and driven by an electric motor 13 having a drive shaft 13A linking the motor 13 with the wheel 11 via elements of a power transmission train shown in the drawings and which elements will be described with appropriate reference numerals as the description proceeds.

Figure 2:
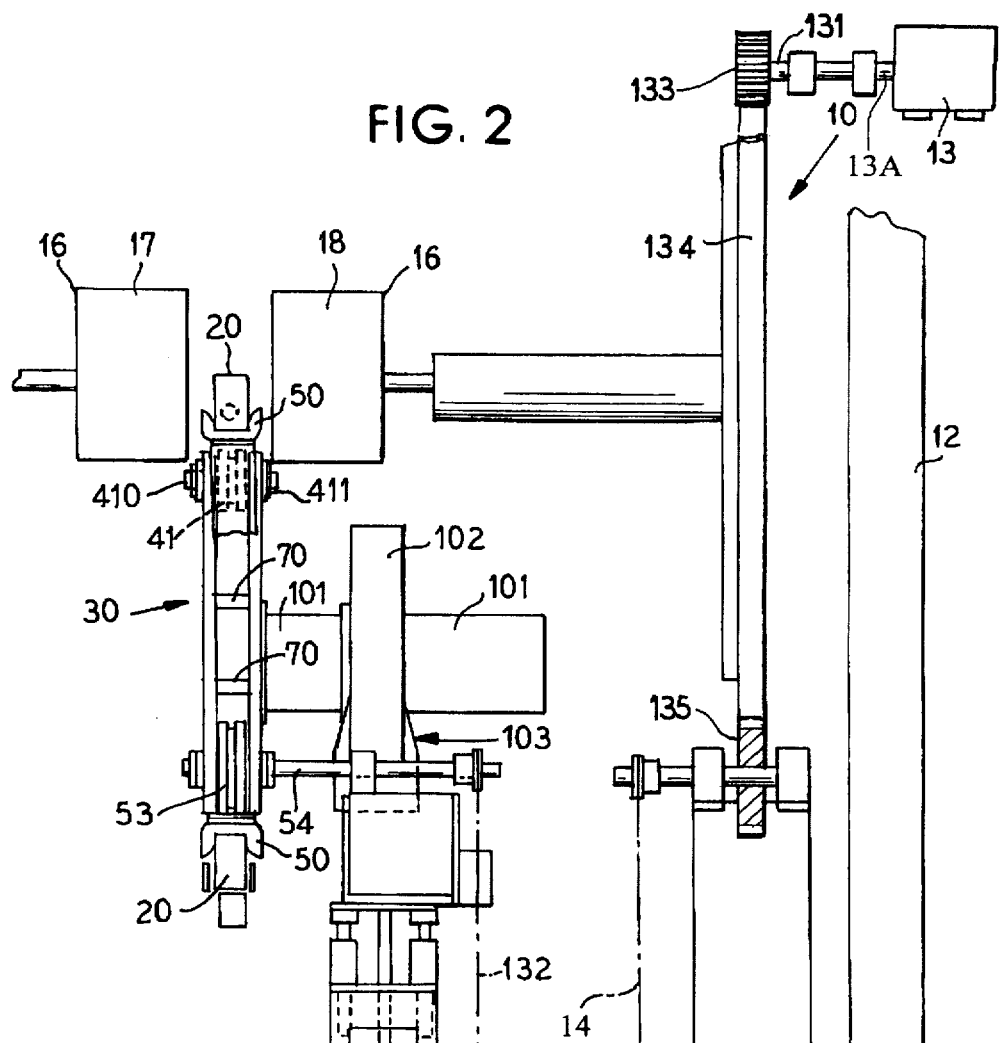
FIG. 2 is a somewhat fragmentary cross-sectional view taken on the plane of line II—II of FIG. 1, but with parts removed and with parts shown in partial section for the sake of clarity.

The wheel 11 carries a plurality of molds 16, with each mold comprising a pair of separable mold components identified by separate reference numerals in FIG. 2, namely mold element 17 and mold element 18, respectively. An injection device shown somewhat schematically at 19 is connected to a suitable source of supply of a molten plastic material for example, molten polystyrene, and a so-called parison is injected into the space between two spaced apart mold elements 17 and 18 as they move through a quadrant of the wheel movement at which the molds 16 are in the open position. The parison communicates with a source of compressed air so that as the mold 16 closes and the mold elements 17 and 18 come together as they move through a quadrant of the wheel movement at which the molds 16 are in the closed position, a charge of compressed air is delivered to the interior of the parison, thereby expanding the molten plastic parison outwardly. The expanded plastic parison engages the walls of the closed mold 16 and assumes the shape of the mold. In the illustrative example of the drawings, there is formed by the molds 16 a molded plastic article which is in the shape of a container such a so-called blow bottle 20.

As the wheel 11 rotates in a counter-clockwise direction, using the orientation of FIG. 1, the expanded plastic congeals and sets in the shape given to it by the walls of the mold 16. By the time the wheel has rotated any given mold from the open mold position adjacent the injection device 19 to the third quadrant some three hundred degrees of rotation subsequent thereto, the mold 16 is ready to open and the molded article 20 is ready to be removed from the mold.

In accordance with the present invention, the mold picker device 30 is provided. Generally, the picker device 30 is intended to constitute a vacuum conveyor made up of a plenum and a moving plastic chain, or belt, to which is attached a plurality of spaced apart buckets, each shaped to guide and accept a molded article, or blow bottle, from the opening mold components 17 and 18 of the molds 16.

Figure 3:
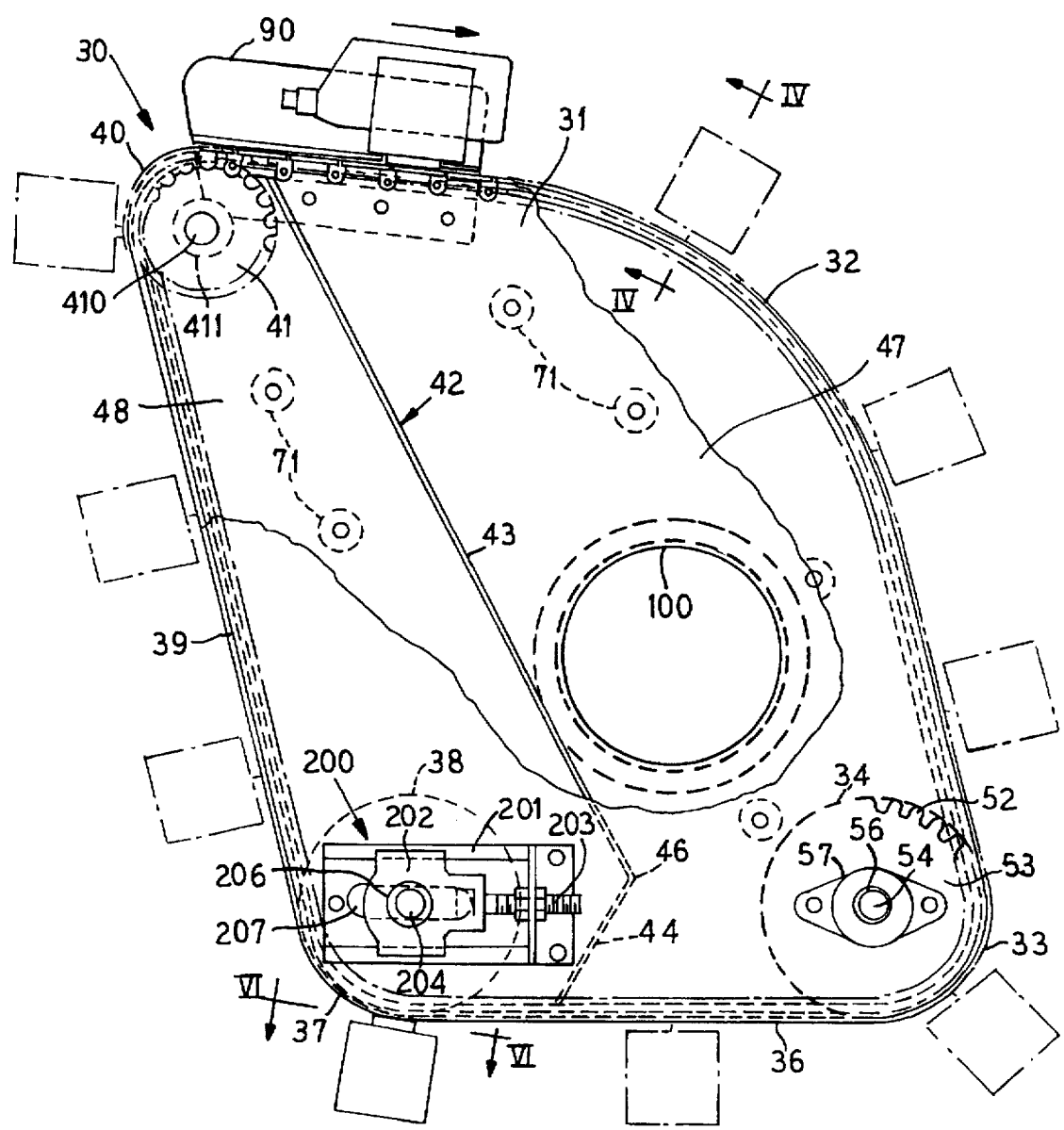
FIG. 3 is an enlarged fragmentary view showing in elevation additional details of the vacuum conveyor made up of a plenum and a moving plastics chain with attached urethane plastic buckets.

Making specific reference to the drawings, there is shown a plenum chamber 31 having a peripheral contour which is a continuous irregular circle, i.e., the peripheral walls of the plenum 31 describe a continuous closed circuitous path, but it is not strictly "circular" as that term is generally interpreted in the mechanical arts. Rather, the peripheral shape of the plenum 31 is more or less a rhomboid. Referring to FIG. 3, the plenum 31 includes a first wall portion 32 which starts at the upper left hand corner and curves generally downwardly and to the right towards a lower right hand corner wall portion 33 formed on a radius of curvature complementary to a rotating member 34.

The plenum 31 then describes a lower horizontal wall portion 36 which terminates in a lower left hand corner wall portion 37 formed on a radius of curvature complementary to a rotating member 38. A straight wall portion 39 extends upwardly and to the left and is joined to the first wall portion 32 by an upper left hand corner wall portion 40 formed on a radius of curvature complementary to a rotating member 41.

Interiorly, the plenum chamber 31 is compartmented by an interior partition wall 42 having a first part 43 extending from the first wall portion 32 downwardly and to the right, and a second part 44 extending upwardly and to the right from the lower horizontal wall portion 36, the two parts 43 and 44 intersecting and joined to one another at 46. The compartmentation thus effected is relatively air-tight except at the periphery and it is contemplated that the compartment 47 on the right hand side of FIG. 3 to the right of the partitioning wall 42 will be operated as a vacuum chamber 47 by connecting it to a blower which evacuates the chamber 47 while the compartment 48 on the left hand side of FIG. 3 and to the left of the wall 42 will in effect, be vented to ambient without any evacuation for the purposes which will be evident.

Figure 6:
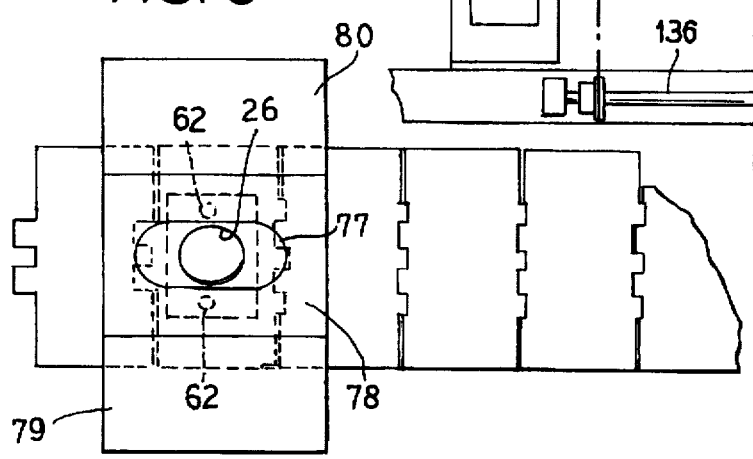
FIG. 6 is fragmentary cross-sectional view taken on line VI—VI of FIG. 3.
Figure 5:
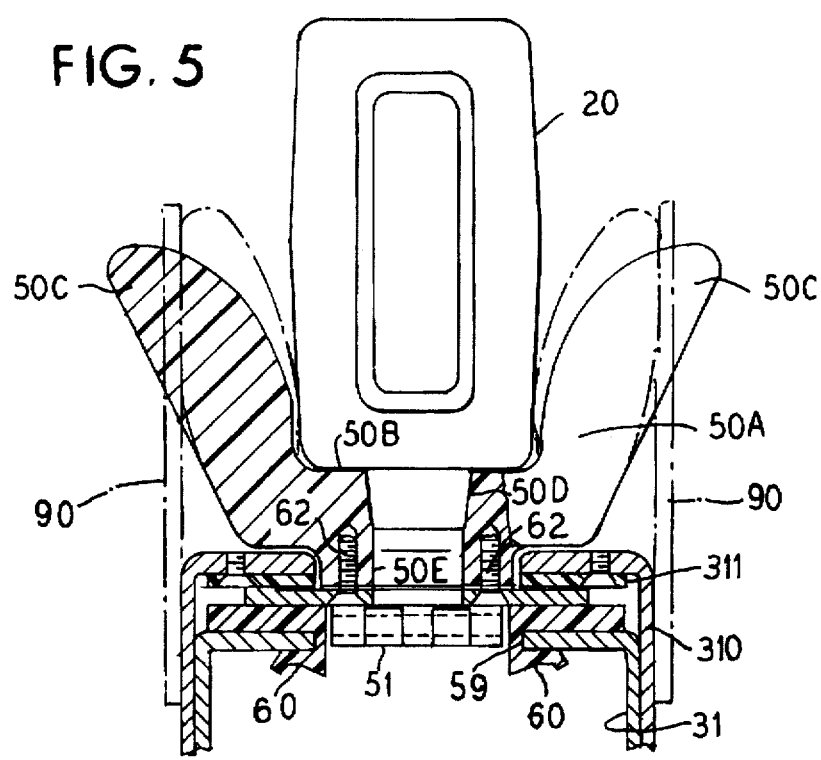
FIG. 5 is a cross-sectional view similar to FIG. 4, but showing a somewhat modified form of the bucket construction provided in accordance with the principles of the invention.
Figure 4:
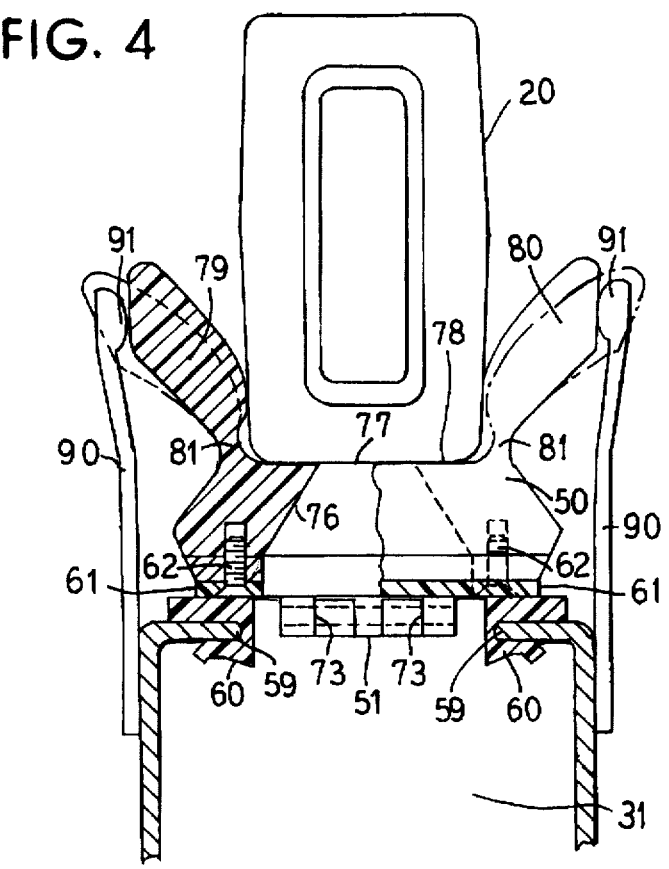
FIG. 4 is a cross-sectional view of one of the vacuum conveyors taken on line IV—IV of FIG. 3.

Referring now to FIGS. 4, 5 and 6 in conjunction with FIG. 3, additional details of the vacuum conveyor made up of a plenum and a moving plastic chain will be described. Recognizing that the plenum 31 constitutes a frame for the picker device 30, it will be noted that there is an upper guide rail means provided by the guide rails 90 (right hand and left hand) thereby to form a guide rail track through and between which each bucket 50 is directed.

A plurality of flights 51 are adapted to be engaged by the teeth 52 (of FIG. 3) of a drive sprocket 53 (of FIG. 2) rotatably driven by a power shaft 54 (FIG. 2). It will be understood that the sprocket 53 will be appropriately journalled in a bearing 56 carried by a flange block 57 (of FIG. 2).

The outer peripheral wall of the plenum 31 has a center track opening 59 and each of the opposing edges of the track opening 59 seats a flat bar clip shown at 60. Segments of a plastic wear strip 61 are secured to the underside of the bucket 50 by a corresponding plurality of bolts 62.

It may be understood that the material from which the flat bar clip shown at 60 is made is known in the trade as "UHMW" material. That material is commercially available and resembles a anti-friction plastic material similar to polyfluoroethylene materials sold under the trademark "TEFLON".

The two opposite walls of the plenum 31 are maintained in spaced apart relationship with one another by a plurality of spacers most clearly shown in FIG. 2 at 70. The walls and the spacers 70 are fastened together by appropriate fasteners which are spaced apart from one another in an may illustrated generally in FIG. 3 at 71.

Disposed between the opposite edges of the track opening 59, the flights 51 have recesses 73 adapted to cooperate with the sprocket teeth 52 formed on the drive sprocket 53. Referring to FIG. 4 in conjunction with FIG. 6, and FIG. 3, it will be noted that the compartments 31 and 48 communicate with a passage 76 formed in the bottom of the bucket 50. The passage 76 has an elongated ovate opening 77 formed in the bottom wall 78 of a generally cup shaped bucket member 50 having sidewalls shown at 79 and 80 respectively.

If desired, the sidewalls 79 and 80 of the bucket 50 may be proportionally thinned to form a hinge section 81 thereby imparting greater flexibility to the arms 79 and 80. Furthermore, at the top of the plenum 31, arm extensions 90 each having appropriate fingers 91 are arranged to exert an inwardly biasing force against the arms 79 and 80 to help and assist in engaging the arms against the bottle thereby to implement the extraction of the molded article or blow bottle from the mold sections 17 and 18 of the mold 16. The reduced hinge portions 81 facilitate the bending motion of the arms 90 as is shown in FIG. 4 where the arms are depicted in both full lines and in dashed lines.

In operation, the apparatus of the present invention will operate as follows. Using the orientation of FIG. 1, a parison, or, a supply of plastic is injected at 19 into the respective molds 16 whereupon air pressure expands the parison to conform to the shape of the closed mold thereby forming a molded article such as a blow bottle 20. The plastic blow bottle will be cooling in the moving mold as the mold moves from the lower right quadrant of the wheel adjacent the injector 19 through the upper right hand quadrant and the upper left hand quadrant. By the time the mold containing the molded article reaches the lower left hand quadrant, the blow bottle 20 is reasonably set and is ready to be extracted from the mold. Thus, the mold halves 17 and 18 start to separate in the lower left hand quadrant and at that point the molds come in register with picker device 30.

The same orientation as is used in FIG. 1 is also used in FIG. 3. It will be noted that the upper left hand portion of the plenum 31 extends in such a manner that the buckets 50 carried on the outer periphery of the plenum pass between the mold sections 17 and 18 and the sidewalls 79 and 80 of the each bucket 50 are engaged against a corresponding sidewall of the molded article or blow bottle 20.

As the mold wheel rotates, the emerging blow bottle 20 is moving in the same direction as the bucket 50. As a matter of fact, according to the principles of the present invention, the belt on the picker 30 is driven at such a rotational speed that at the upper section of the picker 30, i.e., at the time when the bucket 50 is in register with the blow bottle 20 in the rotating wheel 11, the two mechanisms are moving at a zero relative velocity. The blow bottle 20 is then grasped by the bucket 50 and almost immediately the bucket 50 comes in register with the vacuum chamber 47 of the plenum 31. A vacuum force is transmitted through the passage 76 and the wall 77 of the bucket 50 against the adjacent wall of the blow bottle 20, thereby tending to firmly hold the bottle against the bottom wall of the bucket 50.

Thus, the blow bottle 20 is not only grasped by the bucket 50 but is also held by the vacuum force generated within the vacuum chamber 47. This relationship continues as the bucket 50 and the blow bottle 20 carried thereby, passes over the surface of the wall 32, over the surface 33 and the straight wall section 36 until the bucket comes in register with that portion of the plenum wall to the left of the partitioning wall 44, whereupon the vacuum force is terminated because of the venting of the chamber 48 to ambient conditions.

In order to maintain a vacuum force in the chamber 47, one of the sidewalls of the plenum is provided with an opening 100 to which is connected an extension 101 (FIG. 2) communicating with the pressure chamber 102 of a centrifugal blower 103.

The idler sprocket 41 may have a pitch diameter of smaller size than the idler sprocket 34 and is carried on a shaft 410 journalled in a bearing 411 in the plenum 31. A take-up unit is shown at 200 and includes a frame 201 as well as a moveable slide 202 adjustable on the frame by means of an expansion bolt 203. The slide carries the shaft 204 journalled in a bearing 206 and the slide 202 moves relative to an elongated slot 207 thereby permitting the take-up unit 200 to keep an appropriate tension on the plastic belt traversing the periphery of the plenum 31.

As will be noted upon referring to FIG. 2, the zero relative velocity relationship between the picker device 30 and the wheel 11 is insured by using a common drive motor 13 by means of a pinion gear 133, bull gear 134, pinion gear 135 combination. Thus, the wheel 11 is rotated and a power train 14 connected to the power takeoff shaft 136 and a corresponding power train 132 is provided in order to drive the shaft 54. As will be understood by those versed in the art, "virtual zero relative velocity relationships" exist when the correlation of the relatively moving parts is achieved by electronic coordination instead of mechanical coordination.

In FIG. 5, there is shown a slight variation in the form of the invention wherein a supplemental frame is connected at 310 to the plenum 31 and includes a plastic wear strip 311. The bucket shown at 50a is formed without any hinge portions although it is formed with a bottom wall 50b and sidewalls 50c which are somewhat rounded on their inner sides to facilitate gripping the sidewalls of the blow bottle 20. The bottom wall 50b has an opening 50d formed therein through which vacuum force is transmitted through a passage 50e. In all other respects, the structure of FIG. 5 is similar to that already described in connection with FIG. 4 and like reference numerals have been applied where feasible.

As shown in FIG. 1, a conveyor mechanism having a linear conveyor track 500 is disposed adjacent the bottom wall of the plenum 31. When the blow bottle 20 is released from the bucket 50, it is in register with the conveyor track 500 and will be carried by the conveyor mechanism 501 to a position remote from the wheel 11 for further processing of the blow bottle 20.

Although minor modifications might be suggested by those versed in the art, I wish to embody within the scope of the patent warranted hereon all such modifications as reasonably and properly come within the scope of my contribution to the art.

I claim as my invention:

1. A picker mechanism for a blow molding machine comprising, a vacuum conveyor having wall means forming two interior chambers, and an outer peripheral track, a moving plastic chain in said track, a plurality of urethane plastic buckets connected to said plastic chain and each having means to communicate with the interior chambers via said peripheral track, each of said buckets having arms projecting upwardly and shaped to guide and accept a blow bottle molded article from the machine when the mold is opened, means to drive the plastic track and the buckets carried thereby through a circuitous path so that the buckets move at zero relative velocity when positioned adjacent the rotating wheel of a multiple mold machine, and means to selectively produce a vacuum in one of said interior chambers to assist the buckets in removing and moving the molded articles away from the wheel.

2. A picker mechanism for use with a blow molding machine having a multiple mold rotating wheel comprising, in combination, track means extending and driven through a closed circuit, vacuum means at one point in the circuit, picker bucket means on said track means having outwardly projecting sidewalls adapted to engage a blow bottle in the mold of an adjacent blow molding machine and having a bottom wall formed with a through passage through which the blow bottle is exposed to and retained by the vacuum in the picker bucket at said one point in the circuit, ambient means at a second point in the circuit remote from the blow molding machine and including mechanical conveyor means for receiving the blow bottle when the vacuum retention is released by the ambient at the second point in the circuit, thereby to carry the blow bottle away from the blow molding machine.

3. A picker mechanism as defined in claim 2 and drive means for said picker mechanism to drive said track means at a speed such that said picker bucket means is moving at zero relative velocity at said one point in the circuit relative to the corresponding speed of the multiple mold rotating wheel, thereby to facilitate removal of the blow bottle from the mold.

4. In combination, a multiple mold blow molding machine having a rotating wheel, picker means for removing and carrying blow bottles from said wheel to a location relatively remote from said wheel, said picker means comprising a vacuum conveyor having internal plenum means with a moving endless plastic chain traversing an outer peripheral track formed on said plenum means, said picker means further comprising at least one plastic bucket projecting outwardly at said plastic chain to guide and accept a blow bottle emerging from an adjacent mold on said wheel, said track and said internal plenum means together forming a vacuum zone and an ambient zone, said vacuum zone being disposed to engage and retain the emerging bottle in the bucket and said ambient zone being disposed to release the blow bottle from the bucket, and means to drive said plastic chain so that said bucket will move at zero relative velocity relative to said wheel while the emerging blow bottle is picked from the mold.

5. In the combination of claim 4 and further characterized by said picker means having a plurality of plastic buckets spaced apart on said plastic chain in a coordinated relation with the molds on said wheel, thereby to insure registry of a bucket with each emerging blow bottle.

6. The combination of claim 4 wherein a common driving motor is provided and power-train means connected between said rotating wheel and said driving motor and between said plastic chain and said driving motor.

7. The combination of claim 4 wherein driving means include synchronizing means to move the wheel and the picker means.

8. A picker mechanism for a blow molding machine comprising, a vacuum conveyor having wall means forming two interior chambers, and an outer peripheral track, a moving conveying means in said track, a plurality of picker buckets connected to said conveying means each having means to communicate with the interior chambers via said peripheral track, each of said picker buckets having arms projecting upwardly and shaped to accept a blow bottle molded article from the machine when the mold is opened, means to drive the conveying means and the picker buckets carried thereby through a circuitous path so that the picker buckets move at zero relative velocity when positioned adjacent the rotating wheel of a multiple mold machine, and means to selectively produce a vacuum in one of said interior chambers to assist the picker buckets in removing and moving the molded articles away from the wheel.

9. A picker mechanism as defined in claim 8 and further characterized by guide means to pilot the interengagement of said picker buckets with the molded articles.

10. A picker mechanism as defined in claim 9 and drive means for said picker mechanism to drive said moving conveying means at a speed such that each said picker bucket is moving at a relative matching velocity relative to the corresponding speed of the multiple mold rotating wheel when a mold in corresponding adjacency thereto is opened.

* * * * *